3,033,683
PREPARATION OF OILSEED MEAL CONTAINING SOYBEAN SOAPSTOCK
Norman H. Witte and Endre Sipos, Decatur, Ind., assignors to Central Soya Company, Inc., Fort Wayne, Ind., a corporation of Indiana
Filed June 12, 1958, Ser. No. 741,567
8 Claims. (Cl. 99—2)

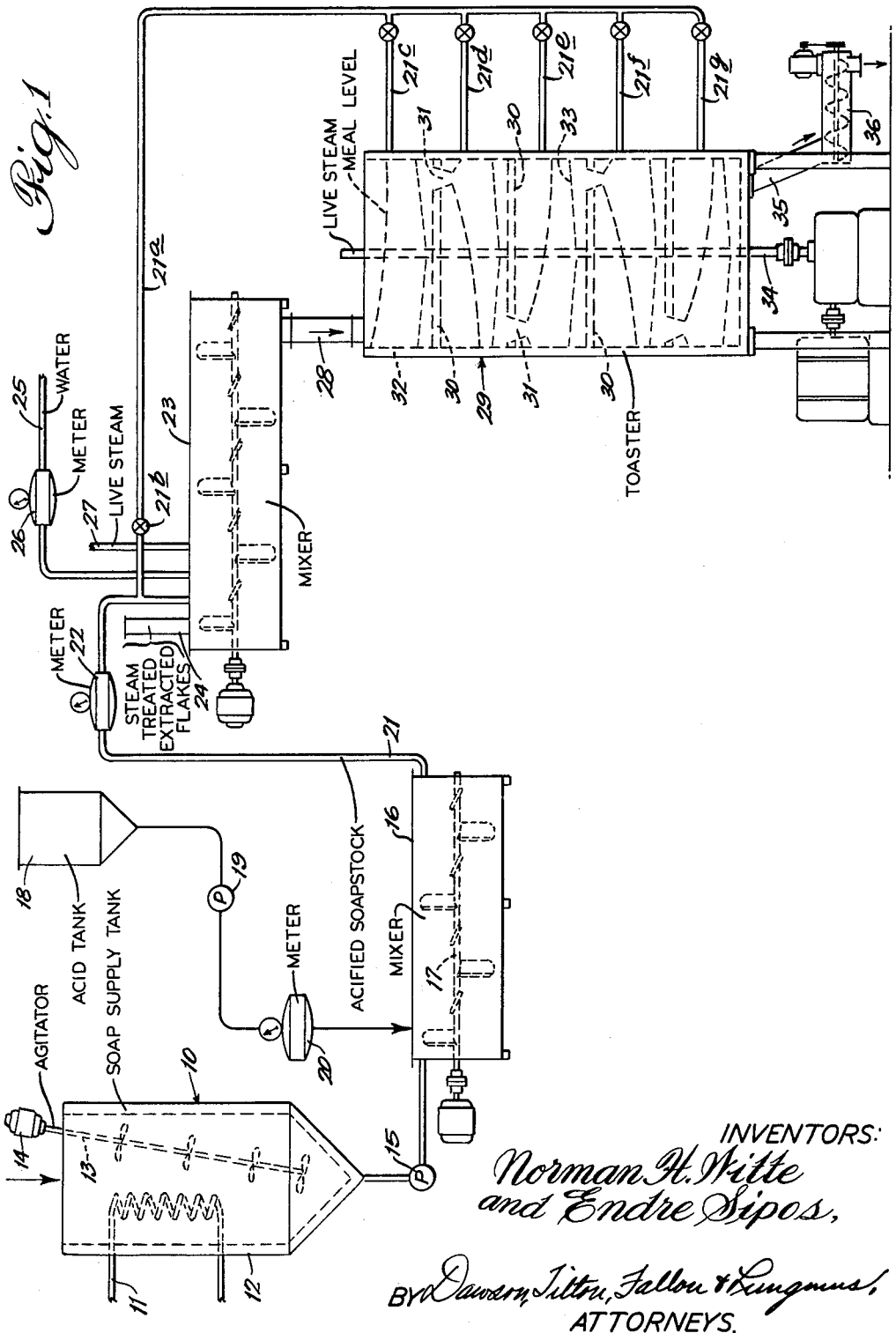

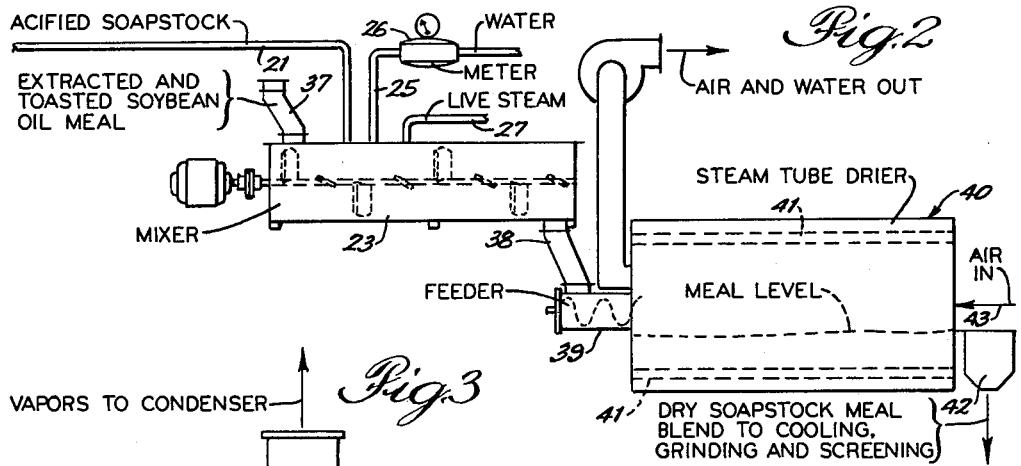
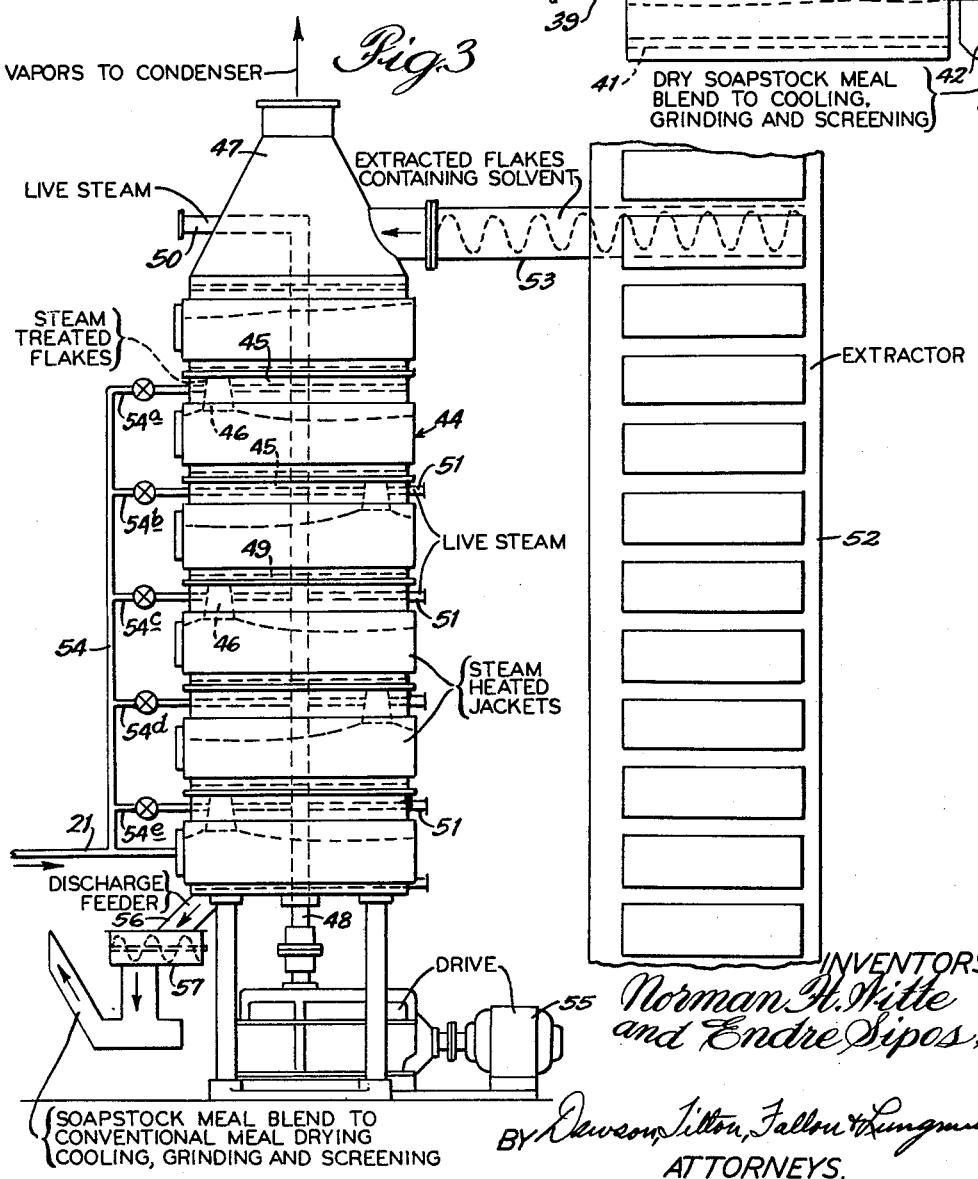

This invention relates to the preparation of oilseed meal containing soybean soapstock. The invention is particularly useful in combining soybean oil soapstock in substantial quantities in oilseed meal and especially in soybean oil meal in order to increase the xanthophyll potency and caloric value of the finished feed.

The desirability of adding fat to meal has been recognized recently as a means for supplying an economical source of energy in feeding rations. However, efforts to supply the fat have met with limited success because of the tendency of the added fat or oil to bleed from the feed into the paper or cloth package, causing subsequent rancidity and interfering with the flow and handling properties of the meal while also making pelleting of the feed very difficult. Further, such a product cannot be produced by the normal mixing methods or techniques, since much of the added fat will remain on the surface of the particles rather than penetrating into the interior, and the resultant product is oily or greasy. As a result of these limitations, the amount of fat which can be effectively added is limited and the maximum benefits from the use of fat could not be attained.

The problem is aggravated when soapstock is considered as a source of fat. "Soybean soapstock" may be defined as the residue obtained in the alkaline refining of soybean oil, and this contains a saponified fatty acid fraction, a phosphatide and sterol fraction, together with some of the pigments of the oil. It is a known market commodity. It is a high energy source, containing approximately 70% of fatty acids on a dry basis. The residue material is emulsified and alkaline in character, has surfactant properties, and has a very high content of xanthophyll.

Since it is the manufacturers' desire to declare the fat content on feed labels, another problem is created by the fact that the excess alkali present in soapstock raises the pH of such a meal-soapstock product; the soapstock cannot be extracted, therefore, as fat by the conventional fat analyses.

The problem is further complicated by the fact that soapstock is an excellent raw material for poultry skin pigmentation by reason of its high content of xanthophyll, and xanthophyll is a material which is rapidly destroyed when soapstock is added to raw extracted soybean flakes. Since recent tests in poultry nutrition place considerable emphasis on both high caloric content and adequate pigment availability in feeds, and since soapstock possesses a unique combination of these qualities, it is important that methods be provided for the incorporation of soapstock into feeds without destroying the xanthophyll content and while also driving the fat material into the interior of the particles so as to provide a free-flowing meal of good texture, having no tendency to bleed into the container material.

An object of the present invention is to achieve the above desired properties in a feed product. A further object is to provide an oilseed meal having a high level of soapstock content with good keeping qualities, while at the same time providing a dry textured meal having good flow and handling properties. A still further object is to incorporate soybean soapstock into an oilseed meal without destroying the pigmentation source and at the same time providing a feed material which may be pelleted to form firm dry pellets. Yet another object is to provide a soybean meal-soapstock product in which the soapstock is at a nearly neutral pH so that the fatty acids are more available for conventional fat analysis. Other specific objects and advantages will appear as the specification proceeds.

The invention is shown in illustrative embodiments by the accompanying drawing, in which—

FIGURE 1 is a broken, schematic layout of apparatus which may be used in the practice of the invention; FIG. 2, a view similar to FIG. 1 but showing modified apparatus; and FIG. 3, a view also similar to FIG. 1 but showing further alternative modified apparatus which may be utilized.

We have discovered that xanthophyll is rapidly destroyed when added to raw extracted soybean flakes, this destruction being apparently due to enzymes in such flakes, and we have further found that desolventizing and deodorizing by steam deactivates such enzymes responsible for the xanthophyll destruction. Apparently, the heat and steaming is effective is destroying or deactivating the enzymes so that the soapstock can be effectively incorporated in the treated soybean flakes, with the result that the flakes can obtain a high caloric content and retain the pigment content of the soapstock.

We have also discovered that the incorporation of soapstock into meal can be greatly facilitated by the action of heat and steam even in the absence of residual solvents in the extracted flakes. Since soapstock is not soluble in organic solvents but soluble in water, in contrast to ordinary fats, the absence of solvent is no disadvantage. The soapstock, being soluble in water, can be reduced in viscosity by the addition of live steam that condenses upon the meal-soapstock mixture when the temperature is maintained below the boiling point of water. The reduced viscosity increases the ability of soapstock to better penetrate the pores of the meal particles; in addition, the combination of the live steam furnishes a driving force which drives the fat into the interior of the meal particles.

Moist heating also promotes an interaction between the meal protein and soapstock, thus permitting a hydrolytic liberation of fatty acids; this will increase the amount of available fat as measured by conventional fat analyses.

When excessively high amounts of soapstock have to be added to the meal, we found that partial acidification of soapstock immediately prior or during the mixing will aid the handling and incorporation process. Partial acidification alters the emulsion structure of the soapstock and may also convert all or part of the true soap to fatty acids; both of these phenomena result in a lowered melting point and a great reduction in viscosity. Partially acidified soapstock can be spread evenly over the feed particles in the form of a thin layer that permits a uniform penetration of the materials into the particles during the heating or steaming process. For the reasons of economy and xanthophyll stability, the acidification is only partial, i.e., the pH is not allowed to go into a very acidic range. We have observed that a partially acidified soapstock, when combined with the meal, still results in a mixture of a pH close to neutrality because of the high buffering capacity of the meal protein. With partial acidification, therefore, several objectives can be attained simultaneously: (1) lowering viscosity without considerably decreasing the water miscibility of soapstock (fatty acids in the presence of protein and sodium ions at a neutral pH are still much better emulsifiable than neutral fats); (2) increasing the availability of fatty acids by conventional fat analyses; and (3) preserving xanthophyll stability.

We prefer that the acidification be sufficient to bring the pH of the soapstock between 3.0 and 8.0. The best results have been achieved when the soapstock has a pH of 5.0 to pH 7.5.

We have also discovered that the addition of alcohol also reduces the viscosity of soapstock, permitting a more uniform mixing of soapstock with meal. The alcohol may be employed in proportions up to 5% by weight, but we prefer that the alcohol addition be in the range of 1% to 2%.

The invention may be practiced in many different forms of apparatus. In the apparatus illustrated in FIG. 1, raw, wet soapstock is stored in tank 10, which may be heated by pipe coils 11 or by means of steam supplied to a jacket 12, the heat being desirable to give the soapstock good flow properties. Included in tank 10 is agitator 13 driven by motor 14 to provide agitation of the raw soapstock so as to yield a homogeneous mixture of raw soapstock.

The soapstock from tank 10 is transferred by pump 15, which is preferably equipped with a variable speed drive (not shown) to mixer 16, which preferably consists of a chamber containing an agitator 17 which may be employed with or without baffles to provide turbulent flow of soapstock. Acid, such as $H_2SO_4$, is introduced into mixer 16 from an acid tank 18 through pump 19 and meter 20. We prefer to employ up to 5% of 100% acid in this manner.

The introduction of acid to the soapstock stream in mixer 16 serves to alter the soapstock pH and physical character so that we can obtain optimum incorporation of fatty material in meal particles. The acidified soapstock leaves mixer 16 through pipe 21 and meter 22 and enters the meal mixer 23, which is similar in construction to the mixer 16. The steam-treated extracted flakes enter mixer 23 through inlet pipe 24. In the feed mixer 23, water may be introduced through pipe 25 and meter 26, and similarly live steam may be introduced through the pipe 27.

The mixed meal and acidified soapstock leave the vessel 23 through the outlet 28 and enter a toaster vessel 29. The toaster vessel may be of any suitable type or construction. In the illustration given, there are provided a series of kettles separated by steam-jacketed bottoms 30 having outlet passages 31 therein so that the flakes may pass downwardly from one compartment to the other. The side walls of the toaster are preferably provided with a steam jacket 32 and the usual sweeps 33 are carried by a central rotating shaft 34. As the shaft 34 rotates, the sweeps move the meal material over the jacketed bottoms 30; the meal flows successively downwardly through the apparatus by means of the outlets 31 and is discharged through the outlet 35 into the screw conveyor 36. From the screw conveyor 36, the material may be carried to other conventional drying, packaging or pelleting apparatus. Since the toaster apparatus described is well known in the art, a further detailed description is believed unnecessary.

Prior to the introduction of the meal and soapstock into the toaster apparatus 29, the steam treated flakes, from which the solvent has been removed, are intimately mixed with the soapstock in the mixer 23. Water may be introduced through pipe 25 and metered in the structure 26 to the mixer 23 while live steam is also introduced through pipe 27 to condition and heat the soapstock and flakes. The conditioned mixture is delivered through the outlet 28 into the toaster 29, the mixture passing downwardly through the toaster and through the series of heated and agitated kettles, being finally discharged through the outlet 35, as above described, to suitable cooling, grinding, and screening processes.

An alternative means for introducing soapstock into the meal is by passing it through the pipe 21a, which is provided with a control valve 21b. From the manifold pipe 21a, the meal may be introduced selectively through the valve-controlled pipes 21c, 21d, 21e, 21f and 21g into the toaster 29.

FIG. 2 illustrates a dryer process which may be employed as an alternative to the toaster process described above. In this operation, the mixing of the soapstock with acid is the same as illustrated in FIG. 1 and the acidified soapstock is conveyed through pipe 21 into a mixer 23, which is the same as that shown in FIG. 1. Similarly, water may be introduced through a pipe 25 having a meter 26 therein, and steam is introduced through line 27. Extracted and toasted soybean oil meal is introduced into the mixer through pipe 37. In this operation, extracted and toasted soybean oil meal and acidified soapstock are intimately mixed within the mixer 23 by means of paddles rotating on a mixer shaft, or by any other suitable motor-driven means, while water and steam are metered into the mixture as heretofore described. The conditioned mixture is discharged through spout or pipe 38 to the feeder conveyor 39 and thence into a steam tube dryer 40. The steam tube dryer 40 is equipped with tubes 41 that contain a heating medium which is continuously introduced and removed as heat content diminishes. The dryer 40 is moved in such a manner as to convey or transport the material introduced to discharge outlet 42. Air and moisture are removed continuously, the air being introduced as indicated by the arrow 43 near the discharge area of the dryer.

It will be understood that other means of air flow can be used, as, for example, parallel flow, to convey moisture from the drying area. Since such a tube dryer is well known in the art, a further detailed description herein is believed unnecessary. The dry meal, having substantially less moisture content than when it entered in feeder 39, is discharged through the outlet 42 to suitable conventional cooling, grinding and screening equipment.

FIG. 3 illustrates the process described herein in which the acidified soapstock is employed in a desolventizer-toaster process. The soapstock enters through pipe 21, having been previously mixed with acid in the mixing apparatus heretofore described in connection with FIG. 1. The desolventizer-toaster apparatus 44 is of well-known construction. It comprises a series of kettles having steam-jacketed bottoms 45 provided with outlet pipes 46 through which meal may pass from one kettle to the next and through which vapors passes upwardly and escapes through a dome 47 leading to a condenser. A hollow shaft 48 is rotated to move sweeps 49 in each of the compartments so as to agitate the meal in each kettle. The meal passes from one kettle to the next through outlet pipes 46. The sweeps in one or more of the upper kettles are hollow and perforated and receive live steam through the steam inlet 50 so that in this manner steam is introduced into the meal for the removal of solvent. Also, live steam is introduced into the meal body through the steam inlet pipes 51. Since such apparatus is well known in the art, a further detailed description is believed unnecessary. A detailed description of substantially the same apparatus is shown in the copending application of Norman F. Kruse and Normal H. Witte, Serial No. 675,641, filed August 1, 1957.

A conventional extractor apparatus is illustrated in FIG. 3 to the right of the toaster 44, and is indicated by the numeral 52. From the extractor, the extracted flakes containing solvent are passed by the screw conveyor 53 into the top kettle of the desolventizer-toaster 44, and here the flakes are surrounded by live steam that heats the flakes and drives off solvent in the form of vapors. The vapors are directed to a condenser (not shown). Further heating of the flakes is done by contacting the flakes with steam-heated jacket and bottom kettle surfaces, or by other suitable heating means. This heating of the flakes makes the protein more suitable for use as feed, as is well known to th eart, and also reduces the character and nature of the not-yet-identified factor present in the extracted flakes that destroys xanthophyll.

As descried, the steam-treated flakes from the top kettle pass downwardly through the series of kettles, and as the flakes move downwardly, the acidified soapstock is introduced through the manifold 54 through valve-controlled pipes 54a, 54b, 54c, 54d, and 54e, or any one or more of such pipes, and mixing of the soapstock and flakes takes place by means of the agitation produced by the sweep-equipped rotating shaft 48 rotated by the motor 55 through suitable drive connections. As described, live steam is introduced through the pipes 51 into the lower kettles to further enhance the penetration of soapstock into the meal particles. The soapstock-meal blend is continuously withdrawn from the apparatus 44 through the discharge 56, discharge feeder 57, and is conveyed to conventional meal-drying, cooling, grinding and screening equipment.

Examples of the processes may be set out in a more specific form as follows:

*Example I*

A sample of steam treated and deodorized extracted soybean flakes was treated with 20% soybean soapstock (moisture content of 47%) and with live steam for 15 minutes in a laboratory toaster provided with stirring paddles. The live steam not only served to raise the temperature of the mixture, but also the condensation of the steam was effective in driving the soapstock into the interior of the meal particles by virtue of lowering its viscosity. The subsequent drying was found to seal in the soapstock within the particles and to give a product having good flow properties. The meal protein also reacted with the soapstock so that most of the fatty acids were made available for fat extraction with petroleum ether or diethylether. The finished product analyzed 7.1% fat and 61 mcg./gm. of xanthophyll.

*Example II*

The process of Example I was followed except that 1% isopropyl alcohol was added to the soapstock prior to mixing it with the meal in order to reduce the viscosity of the soapstock for better spreading action. The viscosity of the soapstock was reduced from 65,000 centipoises at 30° C. to 21,000 centipoises at 30° C. The sample was mixed with much greater ease than in the case of Example I, and in every other respect it was similar to that obtained in Example I. In addition to isopropyl alcohol, ethyl, propyl and butyl alcohols can also be used successfully.

*Example III*

A sample of steam treated and deodorized extracted soybean flakes was treated with 30% partially acidified soybean soapstock (moisture content of 40–60%) and with live steam for 15 minutes in a laboratory toaster.

Acidification was achieved in a mixer by the addition of 5% concentrated sulfuric acid to a previously heated and well agitated soapstock. The resulting acidified material, having a pH of 5.0–6.5, is easily spread out on the surface of meal particles because of its fluid state, in contrast to the gelatinous consistency of raw soapstock and the hard, gummy characteristics of a normal soapstock.

The partially acidified product described in this application is superior to a completely acidified soapstock because it gives greater stability to the xanthophyll pigments present in this material, which are sensitive to very acidic pH's. While the pH range 5.0–6.5 affords good xanthophyll stability, it also causes extensive hydrolysis of the soap with the subsequent liberation of fatty acids that are very low in viscosity, and are easily soaked into the meal particles. When toasting and drying drives off the excessive liquids, the fat is sealed within the meal particles to produce a dry exterior texture and excellent flow properties similar to that claimed for animal and vegetable fats.

Furthermore, such a product is an excellent pigmentation source for broilers because it can contain 80–100 mcg./gm. of xanthophyll. The xanthophyll in this "soapstock meal" also has good storage stability due to the high tocopherol content of soybean soapstock and due to the close to neutral pH of the finished product.

While soapstock cannot be extracted as fat by the conventional analytical methods used in the trade, partially acidified soapstock could be recovered up to 80–90% on dry basis from the meal which is the equivalent of the fatty acid content of soapstock. The addition of 30% partially acidified soapstock to soybean oil flakes resulted in a fat content of 12–14% in the finished product.

*Example IV*

The process was carried on as described in Example I except that cottonseed meal was substituted for the soybean oil meal. The process also, when applied to linseed meal, copra meal, and cornmeal, feather meal and alfalfa meal, gave comparable results to those described in Example I.

*Example V*

The process was carried on as in Example III except that 20% soapstock was used and the steaming took place in a commercial size desolventizer-toaster (FIG. 3) at an intermediate point in the unit where most of the solvent has been removed from the meal and the xanthophyll-destroying enzymes have been deactivated. Since the desolventized flakes in the toaster are still somewhat porous, the fatty acids, upon the hydrolysis of soapstock by sulfuric acid, penetrate into the interior of the particles. The live steam also furnishes a physical force which drives the fat into the material. After the drying, the fat remains sealed in the cellular structure of the meal, and the finished material has no tendency to bleed during the packaging or shipping.

This soapstock-meal after grinding has 60 mcg./gm. of xanthophyll and 9.0% fat. It is an excellent protein, caloric and pigmentation source for broilers.

*Example VI*

Finished soybean oil meal was mixed with partially acidified soapstock in a mixer similar to Example I. Live steam was also added in the mixer to raise the temperature of the mixture and to drive the liquid into the meal. The mixture then passed to horizontal jacketed dryers, where jacket heat was applied to dry out the excess moisture in the mixture and to provide additional heat to completely drive the soapstock into the meal. Finally the meal was cooled in conventional equipment. The product so obtained had a dry texture and very good flow properties.

The final pH was found to be 6.5. That is considered safe for xanthophyll. The cooking temperature and the length of exposure to heat did not destroy any appreciable amount of xanthophyll (98% of theoretical was recovered), and the finished product contained 60 mcg./gm. of xanthophyll and 9% of recoverable fat.

*Example VII*

In this process, 20% wet soybean soapstock, with a moisture content of 47%, was added with and without acidification to finished soybean oil meal. Heating took place in the mixer and drying in a steam tube dryer as illustrated in FIG. 2. Although it was possible with the aid of heat and the steam used during the process to obtain a satisfactory dry product, nevertheless, the acidified product was better, indicating that approximately 10% soapstock on dry basis is the maximum that can be added satisfactorily to finished meal without acidification.

When this amount was added to soybean oil meal without the benefit of heat and steam, a very sticky product was obtained. In addition to the handling characteristics, only a small amount of the soapstock (15%) was recovered as fat by the conventional analytical methods, while with the aid of heat and steam even the unacidified sample gave 87% recovery. This indicates that when soapstock is heated in the presence of moisture vapor with soybean oil meal, there is an interaction between the sodium ion of the soap and the meal protein with the simultaneous release of fatty acids available for fat extraction.

Example VIII

The process of Example III was carried out except that the acid was not added prior to mixing the soapstock with the steam-treated and deodorized extracted soybean flakes. Instead, the required acid was added to the mixture of soap and flakes in the laboratory toaster. The effect of adding the acid was to change the flake-soapstock mixture from a sticky mass which stuck to the stirring arms and walls of the toaster, to a more granular material having a relatively fluid oily surface. The subsequent steaming and drying in the toaster produced a dry textured material similar in all respects to the product of Example III.

While, in the foregoing specification, we have set forth steps of the process in considerable detail for the purpose of illustrating phases of the invention, it will be understood that such details may be varied widely by those skilled in the art without departing from the spirit of our invention.

We claim:

1. In a process for combining soybean soapstock with an oilseed meal, the step of adding alcohol to the soapstock, introducing the soapstock and alcohol into the meal, introducing live steam into the meal while maintaining the meal at a temperature at which the steam will condense thereon, and finally drying the meal.

2. The process of claim 1, in which the alcohol is less than 5% of the soapstock.

3. The process of claim 1, in which the alcohol is 1% to 2% of the soapstock.

4. In a process for incorporating soybean soapstock in soybean extracted flakes containing solvent, the steps of introducing steam into the flakes to remove said solvent, introducing soybean soapstock into the desolventized flakes, introducing live steam into the flakes while the flakes are at a temperature at which the steam will condense thereon, and finally drying the meal.

5. The process of claim 4, in which the meal is cooked in the drying step.

6. The process of claim 4, in which the soapstock is acidified to the pH range of 3.0 to 8.0.

7. The process of claim 4, in which the soapstock is acidified to pH 5.0–6.5.

8. In a process for incorporating soybean soapstock in oilseed meal containing solvent, the steps of introducing steam into the meal to remove said solvent, cooking said meal to toast the same, cooling said meal, adding thereto more than 10% on a weight basis of water-soluble soybean soapstock, again introducing live steam into the meal and soapstock while the meal is at a temperature at which the steam will condense thereon, and finally drying and cooling the meal to obtain a free-flowing dry product.

References Cited in the file of this patent

UNITED STATES PATENTS

| | | |
|---|---|---|
| 2,585,793 | Kruse | Feb. 12, 1952 |
| 2,746,864 | Pack et al. | Mar. 22, 1956 |
| 2,835,584 | Rosenberg | May 20, 1958 |
| 2,841,495 | Stewart | July 1, 1958 |
| 2,958,600 | Thurman | Nov. 1, 1960 |

OTHER REFERENCES

Markley: Soybeans and Soybean Products, vol. II (1951), Interscience Publ., N.Y.C., pp. 644–6.